United States Patent
Krasnikov et al.

(10) Patent No.: US 10,003,924 B2
(45) Date of Patent: Jun. 19, 2018

(54) METHOD OF AND SERVER FOR PROCESSING WIRELESS DEVICE SENSOR DATA TO GENERATE AN ENTITY VECTOR ASSOCIATED WITH A PHYSICAL LOCATION

(71) Applicant: YANDEX EUROPE AG, Lucerne (CH)

(72) Inventors: Andrey Borisovich Krasnikov, Moscow (RU); Alexander Vladimirovich Lukin, Balakhna (RU)

(73) Assignee: YANDEX EUROPE AG, Lucerne (CH)

( * ) Notice: Subject to any disclaimer, the term of this patent is extended or adjusted under 35 U.S.C. 154(b) by 0 days. days.

(21) Appl. No.: 15/674,148

(22) Filed: Aug. 10, 2017

(65) Prior Publication Data

US 2018/0049001 A1 Feb. 15, 2018

Related U.S. Application Data

(60) Provisional application No. 62/373,321, filed on Aug. 10, 2016.

(51) Int. Cl.
*H04W 4/02* (2018.01)
*H04W 64/00* (2009.01)
(Continued)

(52) U.S. Cl.
CPC .......... *H04W 4/025* (2013.01); *G01C 21/206* (2013.01); *G01C 21/32* (2013.01); *G01S 5/0252* (2013.01);
(Continued)

(58) Field of Classification Search
CPC ..... H04W 4/02; H04W 64/00; H04W 64/006; H04W 4/025; G01C 21/206; G01C 21/32;
(Continued)

(56) References Cited

U.S. PATENT DOCUMENTS

| 8,472,980 B2 | 6/2013 | Khorashadi et al. |
| 8,958,822 B2 | 2/2015 | Liang et al. |

(Continued)

FOREIGN PATENT DOCUMENTS

| CN | 103218442 A | 7/2013 |
| CN | 103870990 A | 6/2014 |

(Continued)

OTHER PUBLICATIONS

Aly et al., "Map++: A Crowd-Sensing System for Automatic Map Semantics Identification", IEEE, 2014, 9 pages.
(Continued)

*Primary Examiner* — Charles Appiah
*Assistant Examiner* — Margaret G Mastrodonato
(74) *Attorney, Agent, or Firm* — BCF LLP

(57) ABSTRACT

A method for generating an entity-vector associated with a geographical location is disclosed. The entity-vector is generated based on data from sensors of user-wireless-devices and user profile associated with user-wireless-devices. The method comprises, for a given location: receiving from user-wireless-devices being temporally-associated with the location, first and second sensed parameters from first and second sensors, the sensed parameters having been captured during the user-wireless-device being temporally-associated with the location; for each user-wireless-devices, retrieving an associated user profile and analyzing sensed parameters and user profile to generate, respectively, a given-user first and second parameter vectors and a given-user profile vector; aggregating, each user-wireless devices' (i) given-user first parameter vector, (ii) given-user second parameter vector, and (iii) the given-user profile vector into a pool; applying at least two analysis models to the pool, each analysis model generating its respective pooled-data vector;
(Continued)

based on pooled-data vectors, generating an entity-vector associated with the location.

19 Claims, 4 Drawing Sheets

(51) Int. Cl.
   *G06N 5/02* (2006.01)
   *G01C 21/20* (2006.01)
   *G01S 5/02* (2010.01)
   *G06F 17/30* (2006.01)
   *G01C 21/32* (2006.01)
   *G06N 99/00* (2010.01)

(52) U.S. Cl.
   CPC ............ *G01S 5/0263* (2013.01); *G06N 5/022* (2013.01); *H04W 64/00* (2013.01); *G06F 17/30* (2013.01); *G06F 17/30424* (2013.01); *G06N 99/005* (2013.01)

(58) Field of Classification Search
   CPC ..... G01S 5/0252; G01S 5/0263; G06N 5/022; G06N 99/005; G06F 17/30; G06F 17/30424
   See application file for complete search history.

(56) References Cited

U.S. PATENT DOCUMENTS

| | | | |
|---|---|---|---|
| 8,983,976 B2 | 3/2015 | Paruchuri et al. | |
| 9,123,259 B2 | 9/2015 | Zheng et al. | |
| 9,269,259 B2 | 2/2016 | Mondal et al. | |
| 9,335,175 B2 | 5/2016 | Zhang et al. | |
| 2007/0239813 A1* | 10/2007 | Pinder .................... G01S 19/48 708/270 |
| 2011/0081634 A1 | 4/2011 | Kurata et al. | |
| 2013/0023247 A1 | 1/2013 | Bolon et al. | |
| 2013/0057686 A1 | 3/2013 | Genc et al. | |
| 2013/0073387 A1 | 3/2013 | Heath | |
| 2013/0073400 A1 | 3/2013 | Heath | |
| 2013/0096817 A1 | 4/2013 | Fauci et al. | |
| 2013/0344895 A1 | 12/2013 | Glachant et al. | |
| 2014/0040179 A1 | 2/2014 | Herzog et al. | |
| 2014/0100835 A1* | 4/2014 | Majumdar ........... G06Q 10/047 703/11 |
| 2014/0201276 A1 | 7/2014 | Lymberopoulos et al. | |
| 2014/0372160 A1 | 12/2014 | Nath et al. | |
| 2015/0011246 A1 | 1/2015 | Mohammad et al. | |
| 2015/0148061 A1 | 5/2015 | Koukoumidis et al. | |
| 2015/0170514 A1 | 6/2015 | Stenneth | |
| 2015/0285639 A1 | 10/2015 | Basalamah et al. | |
| 2015/0347474 A1 | 12/2015 | Mondragon et al. | |
| 2015/0349810 A1* | 12/2015 | Baxley ............... H04W 12/08 455/500 |
| 2016/0033289 A1 | 2/2016 | Tuukkanen et al. | |
| 2016/0073229 A1 | 3/2016 | Haro et al. | |
| 2016/0195400 A1 | 7/2016 | Young et al. | |
| 2016/0258761 A1* | 9/2016 | Jovicic ............... G01C 21/206 |
| 2017/0195731 A1* | 7/2017 | Girlando ............ H04N 21/4668 |

FOREIGN PATENT DOCUMENTS

| | | |
|---|---|---|
| CN | 104881800 A | 9/2015 |
| CN | 104899760 A | 9/2015 |
| CN | 105187139 A | 12/2015 |
| CN | 105245345 A | 1/2016 |
| KR | 20160026003 A | 3/2016 |
| WO | 2015173757 A1 | 11/2015 |

OTHER PUBLICATIONS

Bocconi et al., "Social Glass: A Platform for Urban Analytics and Decision-Making Through Heterogeneous Social Data", www 2015 Companion, May 18-22, 2015, pp. 175-178.
Ganti et al., "Mobile crowdsensing: current state and future challenges", IEEE Communications Magazine 49.11, pp. 1-9.
Chaudhary et al., Finding occupancy in buses using crowdsourced data from smartphones, Proceedings of the 17th International Conference on Distributed Computing and Networking, ACM, 2016, 4 pages.
Zappatore et al. "Improving Urban Noise Monitoring Opportunities via Mobile Crowd-Sensing", Springer International Publishing, 2016, 13 pages.
English Abstract of CN103218442 retrieved from Espacenet on Jun. 16, 2017.
English Abstract of CN105245345 retrieved from Espacenet on Jun. 16, 2017.
English Abstract of KR20160026003 retrieved from Espacenet on Jun. 16, 2017.
English Abstract of CN104899760 retrieved from Espacenet on Jun. 16, 2017.
English Abstract of CN103870990 retrieved from Espacenet on Jun. 16, 2017.
English Abstract of CN104881800 retrieved from Espacenet on Jun. 16, 2017.
English Abstract of CN105187139 retrieved from Espacenet on Jun. 16, 2017.

* cited by examiner

METHOD OF AND SERVER FOR PROCESSING WIRELESS DEVICE SENSOR DATA TO GENERATE AN ENTITY VECTOR ASSOCIATED WITH A PHYSICAL LOCATION

CROSS-REFERENCE TO RELATED APPLICATION

This United States Non-Provisional Application claims priority from U.S. Provisional Application Ser. No. 62/373,321, filed on Aug. 10, 2016, the entire content of which is incorporated herein by reference.

FIELD

The present technology relates to processing wireless device sensor data in general and, more specifically, to a method of and a server for processing wireless device sensor data to generate an entity vector associated with a physical location.

BACKGROUND

Nowadays, a typical user has access to a plethora of electronic devices. Some of these electronic devices are stationary (such as, desktop computers and TV's, for example), others are mobile (such as, smartphones, tablet devices, laptops, wearable electronics, smart watches, fitness trackers, augmented reality glasses, and the like). A typical one of the wireless electronic devices is equipped with a plurality of sensors and modules which are capable of measuring various sensed parameters, as well as analyze the sensed parameters. Some of these sensed parameters are representative of the immediate ambient environment of the electronic device, others are representative of physiological parameters associated with the user of the electronic device.

US patent application 2015/285639 discloses a system and method that leverages standard cell-phone sensors in a crowdsensing approach to automatically enrich digital maps with different road semantics like tunnels, bumps, bridges, footbridges, crosswalks, road capacity, among others is described. Our analysis shows that cell-phones sensors with humans in vehicles or walking get affected by the different road features, which can be mined to extend the features of both free and commercial mapping services. We present the design and implementation of Map++ and evaluate it in a large city. Our results show that we can detect the different semantics accurately with at most 3% false positive rate and 6% false negative rate for both vehicle and pedestrian-based features. Moreover, we show that Map++ has a small energy footprint on the cell-phones, highlighting its promise as a ubiquitous digital maps enriching service.

US patent application 2016/0073229 discloses an approach for determining new point(s)-of-interest based, at least in part, on mobile device positioning, three dimensional location data, or a combination thereof. The approach involves processing and/or facilitating a processing of location information associated with a plurality of devices to determine one or more location points at which there are one or more concentrations of the plurality of devices. The approach also involves causing, at least in part, an accessing of three-dimensional data representing the one or more location points. The approach further involves processing and/or facilitating a processing of the three-dimensional data to determine one or more features that are indicative of a presence of one or more points of interest. The approach also involves determining one or more candidate points of interest based, at least in part, on the one or more features.

US patent application 2014/0201276 discloses various technologies pertaining to crowd sourcing data about an entity, such as a business. Additionally, technologies pertaining to inferring metadata about the entity based upon crowd sourced data are described. A sensor in a mobile computing device is activated responsive to a user of the mobile computing device checking in at an entity. Metadata, such as occupancy at the entity, noise at the entity, and the like is inferred using the data captured by the sensor. A search result for the entity includes the metadata.

U.S. Pat. No. 9,269,259 discloses methods and systems for processing crowd-sensed data. The method includes receiving the crowd-sensed data from a mobile device associated with a user. The crowd-sensed data corresponds to metadata of an event pertaining to an aberration in at least one of a public service, a public infrastructure, a private service, or a private infrastructure. Thereafter, the event may be prioritized based at least on a type of the event, a measure of impact of the event, or a measure of urgency to resolve the event. Further, a notification of the event may be transmitted to an organization responsible to at least resolve the event, based on the prioritizing, wherein the notification comprises at least the metadata.

U.S. Pat. No. 8,472,980 discloses system for the collection, aggregation and analysis of location based crowdsourcing data includes a server that server that controls the distribution of crowdsourcing requests and workloads to a plurality of external mobile platforms. The server receives crowdsourcing queries from multiple parties and provides measurement requests to the mobile platforms, e.g., based on the location of the mobile platforms. Upon receipt of the measured contextual data from the mobile platforms, the server may distribute information, such as the raw measured contextual data or an analysis of the measured contextual data, to the appropriate requesting parties in a secure manner. The mobile platform may receive a plurality of measurement requests from a remote server, wherein the plurality of measurement requests are based on crowdsourcing queries from a plurality of parties. The mobile platform may measure and provide to the remote server contextual data in response to the plurality of measurement requests.

U.S. Pat. No. 9,335,175 discloses techniques for constructing a scalable model of an indoor space using crowd-sourced inertial navigation system (INS) signals from mobile devices. By tracking INS signals from a number of participating users, the user's trajectories can be estimated as they move their mobile devices indoors. The estimated trajectories can be scored against similar routes taken by other users. Routes with the highest scores are then laid out over a map of the indoor space to identify areas most often traveled to and from landmarks and distances between the landmarks.

Chinese patent application CN103218442 discloses a method and a system for life mode analysis based on mobile device sensor data. The method comprises the steps: initial data are collected from each sensor of a mobile device; data preprocessing is conducted on the initial data according to data characteristics and energy consumption characteristics of each sensor and a data sequence is obtained; a resident point sequence is obtained according to a resident point detection mode; cluster analysis is conducted on the resident point sequence so that a site historical sequence is obtained; interest point search is conducted on each piece of data in the site historical sequence and site history is marked; and whether identity of a user is known or not is judged, if the answer is negative, the identity of the user is deduced according to interest point marks. The method and the system for the life mode analysis based on the mobile device sensor data reduce data mining and analyzing cost, improve using flexibility, have transportability and are convenient to use and capable of improving experience of the user.

SUMMARY

Developers of the present technology have appreciated at least one technical problem associated with the prior art approaches to processing crow-sourced wireless device sensor data.

More specifically, developers of the present technology have appreciated that there is a large number of user electronic devices that are capable of supplying a vast amount of information of different types about the physical world, which is obtained by the sensors of the user electronic devices. Embodiments of the present technology aim at leveraging the immense amount of sensor data, combined with information regarding user interactions (such as but not limited to: search engine searches, web browsing history, etc.) of users associated with a given electronic device, in order to generate a universal model of the physical world. Embodiments of the present technology generate the universal model based on a plurality of entity-vectors, each of the entity-vector being associated with a particular physical entity (a building, a portion of the building, a Point of Interest, a movable physical object, and the like). The entity-vector can be temporal in nature or, in other words, can be associated with a particular physical entity for a specific period of time.

Thus, embodiments of the present technology are directed to a method and a system for efficient collection and analysis of wireless device sensor data and/or user interaction history data to generate one or more universal feature vectors (i.e. the entity-vector) for one or more physical entities of the physical world. The resultant entity-vector can be used as entity descriptors reflecting user-independent and/or user-dependent properties of the physical entities.

The nature of the physical entity is not particularly limited. As an example, physical entities may be obtained through generation of regions on an electronic map and each region may be considered a separate physical entity. For example, the electronic map may be divided into equal regions of a pre-defined size through applying a square grid onto the electronic map. In some embodiments, regions of different size and shape may be generated. For example, areas with higher user population density or higher concentration of known Point of Interest (POI's) may be split into physical entities by applying a grid with comparatively smaller cells. On the other hand, rural or uninhabited areas or those with low concentration of POI's may be split into larger regions by applying a grid with comparatively larger cells. In some implementations, known POI's, buildings, road segments, elements of infrastructure or other objects of the physical world may be considered as individual physical entities.

Once the one or more entity-vectors are generated they can used for various analytical reasons. For example, the one or more entity-vectors can be used for training an auxiliary analysis models (such as supervised or unsupervised trained Machine Learning Algorithms) for various purposes, such as identifying, classifying, or clustering of various types of physical entities.

Some examples of specific non-limiting examples of technical areas where the resultant entity-vector and an analysis thereof can be used are provided below.

Data Mining

User Specific and Temporal Point of Interest (POI) Classification (by Interest, Task, Activity, etc.)

The present technology may allow classification of a given POI based on user interests, tasks and/or activities that were conducted at the given POI. The interest, task and/or activity may be determined based on user specific data and sensor data such as movement patterns, level of noise, heart-rate and more. Also, since a given entity-vector may comprise a time component, the given POI may belong to a different class of interest, task and/or activity during different intervals of time. For example, the given POI may be classified as a park from 10 am to 6 pm and as a workout area from 6 pm to 9 pm.

User Specific Rating and Auto-Evaluation of POIs

The present technology may allow acquiring user ratings about a given POI without users being required to enter any information about their experience at the given POI (or with the user having to enter only a minimum set of information). For example, based on the entity-vector associated with the given POI, it may be possible to determine whether the given POI has been considered as desirable by the users that visited the given POI. For example, by capturing sensor data such as ambient noise and travelled distance within the POI, and the user specific data, it may be possible to evaluate specific user preferences and to determine based on the sensor data whether those preferences have been satisfied while visiting the given POI. As a result, an auto-evaluation of POIs may be enabled by the present technology.

User Specific Map Enrichment and Display

Real-Time Geo-Fencing Information for Augmenting Map Services

The present technology may allow determining geo-fences in real-time for enriching map data. For example, by tracking user movement patterns and user specific data associated with their route preferences, it may be possible to determine whether something is blocking a road or access thereto (e.g., a real fence, a parade blockade, an accident, a closed bridge, etc.). In response to real-time determination of such geo-fences, map services that offer route suggestions may be modified accordingly in order to provide generated routes which take into account the determined geo-fences.

Real-Time and User Specific Venue of Interest (VOI) Discovery and Display

The present technology may allow discovering in real-time venues of interests for specific users and selectively displaying them on a map. Based on an entity-vector associated with a first geo-location of a first physical object, it may be possible to determine that an important number of people that like physical activities are gathered around the first geo-location and are in motion within the first physical object. Based on entity-vectors associated with a second geo-location of a second physical object, it may be possible to determine that an important number of people that like concerts are gathered at the second geo-location where an elevated amount of noise is recorded by their devices. As a result, if a current user accesses the map service and is determined to like physical activities based on his user specific data, the map may display the venue of interest being a workout gathering which is at the first physical object. However, if a current user accesses the map service and is determined to like concerts based on his user specific data, the map may display the venue of interest being a concert event which is at the second physical object.

Customized Interactive Map Display of User Specific Social Activity

The present technology may allow generating customized interactive map displays based on user specific data. For example, if a current user accesses the map service and is determined to like concerts, the map may be augmented with Venue of Interest (VOI) corresponding to social activities such as concerts. Moreover, the present technology may allow the current user to select a particular VOI being displayed in order to view real-time information associated with the particular VOI. Such real-time information may correspond to the number of people at the VOI, the level of noise at the VOI, pictures being currently taken at the VOI, etc.

Indoor Navigation for User Specific Interests or Needs

The present technology may allow tracking user movement patterns inside a physical dwelling and associate them with their respective user specific preferences. For example, a current user may access a mall and a server may determine, based on the current user's user specific data, that the current user likes sport gear. Further, by analysing the entity-vector associated with the physical object being the mall, it may be possible to determine previous movement patterns of users in the mall that liked sport gear. As a result, a preferential movement pattern may be selected and displayed to the current user for reaching a sport gear shop.

Selective Map Display of User Specific and Temporal POI Clusters

The present technology may allow classification of a given POI based on user interests, tasks and/or activities that were conducted at the given POI. Moreover, the given POI may belong to a different class of interest, task and/or activity according to different interval of times for which entity-vectors have been generated. For example, the given POI may be classified as a park from 10 am to 6 pm and as a workout area from 6 pm to 9 pm. As a result, the present technology may also allow a selective map display of POI depending on user specific data of a current user having selected the map and also depending on the current period of the day since the class of a given POI may change during the day and, therefore, become relevant/irrelevant for the current user based on his user specific data.

User Specific Content Targeting

User Specific Content Targeting Based on Geo-Localised and Temporal User Interests The present technology may allow providing current users with targeted content based on geo-localised and temporal user interests. A physical object may be associated with an entity-vector that may be at least partially indicative of user interests of users having been in the physical object throughout the past days. If the current user enters the physical object or passes by near the geo-location of the physical object at a certain time, based on the entity-vector, the current user may be provided with targeted content that is associated with user preferences of users that usually visit the physical object during that certain time.

Billboard Efficiency Validation Based on Geo-Localised User Specific Patterns

The present technology may allow validating the efficiency of billboards and, more specifically, the efficiency of billboards based on their location. Via the entity-vector, the system may identify specific users which passed in front of a physical object where a specific billboard about a given product is known to be displayed. As such, based on the user specific data, the user may be identified during his next search session and may be presented with an online advertisement corresponding to the one displayed on the billboard. Depending on whether the user selects the online advertisement, it may be possible to determine that the location of the specific billboard was effective and influenced the user to select the online advertisement.

Current Waiting Time for User Specific Services.

Augmenting Transportation Services by Computing Reduced Occupancy Routes

The present technology may allow determining occupancy levels of various transportation services. For example, based on an entity-vector, it may be possible to determine how users are moving in a physical object such as a bus, a train, a metro, etc. As a result, a level of occupancy of a specific transport may be determined for different transportation services and that for specific users which are travelling along a specific route. Therefore, it may be possible to recommend an alternative route to a current user who desires to travel along that preferential route, which is determined based on user specific data. The alternative route may be recommended based on whether the transportation services for the specific route are highly occupied or not.

Real-Time Waiting Time Estimations of User Specific Services

The present technology may allow determining waiting times for user specific services and suggesting alternatives therefor. Based on entity-vectors of different physical objects, it may be possible to determine an amount of waiting time that specific users spend at each physical object. Moreover, it is possible to determine user specific behaviours of users that attend these specific services in order to determine which physical object may be relevant to a current user. For example, if it is determined that a current user recently searched for dentists in her area, it may be possible to suggest a specific dentist office associated with one of the physical objects and provide the user with an estimation of the current waiting time at that specific dentist office. In an eventuality where the waiting time is judged to be too long, the current user may be recommended to visit a coffee shop (another physical object nearby that users with similar preferences usually visit before or after the dentist appointment) until the estimated waiting time at the specific dentist office is lower than a threshold.

As such, in accordance with a first broad aspect of the present technology, there is provided a method executable at a server, the server being a part of a system, the system including a plurality of user-wireless-devices accessible by the server via a communication network; each of the plurality of user-wireless-devices including at least two sensors, each of the at least two sensors outputting a respective sensed parameter; the server hosting a repository of user profiles. The method comprises, for a given geographical location: receiving, by the server, from at least a portion of the plurality of user-wireless-devices, the at least the portion of the plurality of user-wireless-devices being temporally-associated with the given geographical location within a first period of time, a first sensed parameter from a first sensor and a second sensed parameter from a second sensor, the first sensed parameter and the second sensed parameter having been captured during the user-wireless-device being temporally-associated with the given geographical location; for the each of the at least the portion of the plurality of user-wireless-devices, retrieving an associated user profile; for each user-wireless-device of the portion of the plurality of user-wireless-devices, analyzing the first sensed parameter, the second sensed parameter, and the user profile to generate, respectively, a given-user first parameter vector, a given-user second parameter vector, and a given-user user profile vector; aggregating, each user-wireless devices' (i)

given-user first parameter vector, (ii) given-user second parameter vector, and (iii) the given-user user profile vector into a pool of vectors; applying at least two analysis models to the pool of vectors, each analysis model generating its respective pooled-data vector; based on the at least two respective pooled-data vectors, generating an entity-vector associated with the at least one geographical location.

In some implementations of the method, the analyzing the first sensed parameter, the second sensed parameter, and the user profile vector comprises: applying a first algorithm to the first sensed parameter; applying a second algorithm to the second sensed parameter; applying a third algorithm to the user profile; the first algorithm, the second algorithm, and the third algorithm having been pre-selected of a respective data type of the first sensed parameter, the second sensed parameter, and the user profile.

In some implementations of the method, at least a portion of the method is executed by a neural network.

In some implementations of the method, the neural network is long short-term memory (LSTM) based neural network.

In some implementations of the method, the given geographical location is a first geographical location and wherein the method further comprises: for a second geographical location repeating the steps of: receiving, retrieving, analyzing, aggregating, applying, and generating the entity-vector.

In some implementations of the method, the method further comprises: for the given geographical location associated with at least one physical entity: receiving, by the server, from at least the portion of the plurality of user-wireless-devices, the at least the portion of the plurality of user-wireless-devices being temporally-associated with the given geographical location within a second period of time, a third sensed parameter from the first sensor and a fourth sensed parameter from the second sensor, the third sensed parameter and the fourth sensed parameter having been captured during the user-wireless-device being temporally-associated with the given geographical location during the second period of time; for each user-wireless-device of the portion of the plurality of user-wireless-devices, analyzing the third sensed parameter and the fourth sensed parameter to generate, respectively, a given-user third parameter vector and a given-user fourth parameter vector; aggregating, each user-wireless devices' (i) given-user third parameter vector, (ii) given-user fourth parameter vector, and (iii) the given-user user profile vector into a second pool of vectors; applying at least two analysis models to the second pool of vectors, each analysis model generating its respective second pooled-data vector; based on the at least two respective second pooled-data vectors, generating a second entity-vector associated with the at least one geographical location for the second period of time.

In some implementations of the method, the second entity-vector is different from the entity vector.

In some implementations of the method, the method further comprises generating a vector trend model based on the entity vector and the second entity-vector.

In some implementations of the method, the vector trend model allows predicting a third entity-vector associated with the at least one geographical location associated with a third period of time.

In some implementations of the method, the vector trend model allows determining a shift in pattern for a third entity-vector associated with the at least one geographical location associated with a third period of time.

In some implementations of the method, the method further comprises using the entity vector and the second entity vector as an input into an auxiliary machine learning algorithm to train auxiliary machine learning algorithm to predict a particular parameter.

In some implementations of the method, the generation of the entity vector and the second entity vector is done without the knowledge of the particular parameter.

In some implementations of the method, at least some of the first algorithm, the second algorithm, and the third algorithm are different.

In some implementations of the method, the method further comprises analyzing the second entity-vector and the entity vector to determine a static vector portion and a dynamic vector portion.

In some implementations of the method, the applying at least two analysis models to the pool of vectors comprises applying at least two different analysis models, each analysis model applying its own algorithm to output its respective pooled-data vector.

In some implementations of the method, at least one of the at least two analysis models comprises a probabilistic analysis model In some implementations of the method, at least one of the at least two analysis models comprises at least one of heuristics and a clusterization algorithm.

In some implementations of the method, at least one of the at least two analysis models comprises a recurrent neural network.

In some implementations of the method, at least one of the at least two analysis models comprises a latent dirichlet allocation (LDA) model.

In the context of the present specification, a "server" is a computer program that is running on appropriate hardware and is capable of receiving requests (e.g. from electronic devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g. received instructions or requests) or any particular task will have been received, carried out, or caused to be carried out, by the same server (i.e. the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expression "at least one server".

In the context of the present specification, "electronic device" is any computer hardware that is capable of running software appropriate to the relevant task at hand. Thus, some (non-limiting) examples of electronic devices include personal computers (desktops, laptops, netbooks, etc.), smartphones, and tablets, as well as network equipment such as routers, switches, and gateways. It should be noted that a device acting as an electronic device in the present context is not precluded from acting as a server to other electronic devices. The use of the expression "a electronic device" does not preclude multiple electronic devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, etc.

In the context of the present specification, the expression "computer usable information storage medium" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
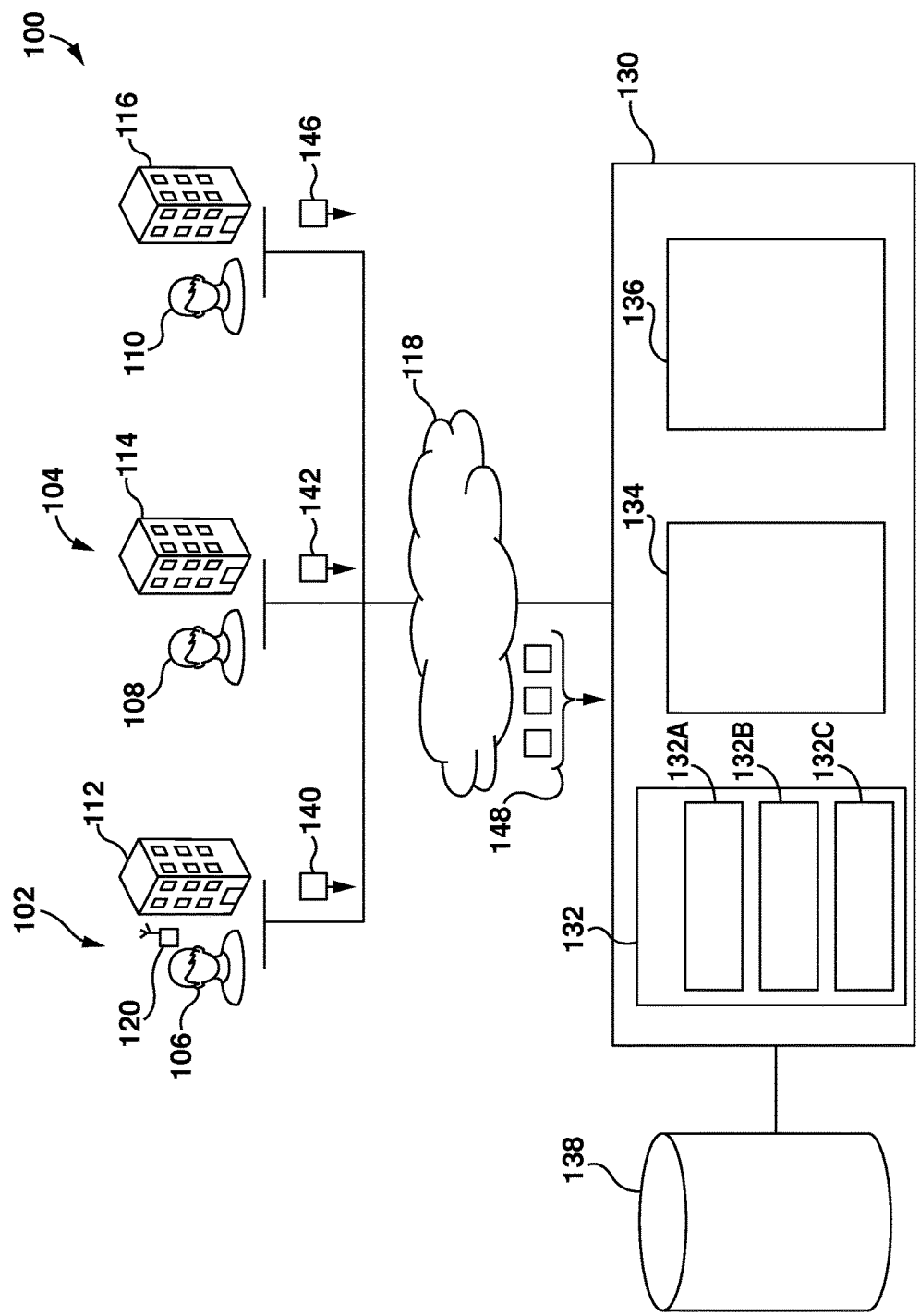
FIG. 1 depicts a diagram of a system implemented in accordance with non-limiting embodiments of the present technology.

FIG. 1 illustrates a system 100 in accordance with one implementation of the present technology. It is to be expressly understood that the system 100 is merely one possible implementation of the present technology. Thus, the description thereof that follows is intended to be only a description of illustrative examples of the present technology. This description is not intended to define the scope or set forth the bounds of the present technology. In some cases, what are believed to be helpful examples of modifications to system 100 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e. where no examples of modifications have been set forth), it should not be interpreted that no modifications are possible and/or that what is described is the sole manner of implementing that element of the present technology. As a person skilled in the art would understand, this is likely not the case. In addition it is to be understood that the system 100 may provide in certain instances a simple implementation of the present technology, and that where such is the case they have been presented in this manner as an aid to understanding. As persons skilled in the art would understand, various implementations of the present technology may be of a greater complexity.

The system 100 comprises a plurality of users 102 located in a plurality of geographical locations 104. The plurality of users 102 includes a first user 106, a second user 108, and a third user 110. Each of the first user 106, the second user 108, and the third user 110 is associated with its respective one of the plurality of geographical locations 104. Each of the geographical location can have one or more physical entities associated therewith, such as a first physical entity 112, a second physical entity 114, and a third physical entity 116. As such, it can be said that the first user 106 is in close physical proximity to the first physical entity 112, the second user 108 is in close physical proximity to the second physical entity 114, and the third user 110 is in close physical proximity to the third physical entity 116.

It should be noted that each of the first user 106, second user 108, and the third user 110 in itself can comprise a plurality of users or, in other words, a given one of the first user 106, second user 108, and the third user 110 can be part of its respective plurality of users.

By the same token, each of the first physical entity 112, the second physical entity 114, and the third physical entity 116 can comprise a plurality of physical entities or, in other words, a given one of the first physical entity 112, the second physical entity 114, and the third physical entity 116 can be part of its respective plurality of physical entities associated with a given one of the geographical locations 104.

It is also noted that the relationship between a given one of the first user 106, second user 108, and the third user 110 and a given one of the first physical entity 112, the second physical entity 114, and the third physical entity 116 can be temporal in nature. In other words, the relationship between a given one of the first user 106, second user 108, and the third user 110 and a given one of the first physical entity 112, the second physical entity 114, and the third physical entity 116 can change over time. For example, a given user (such as the first user 106) can be moving around and such, over time, the first user 106 can be associated with the first physical entity 112, at another time the first user 106 can be associated with the second physical entity 114, and at yet another time the first user 106 can be associated with the third physical entity 116 (as well as with other physical entities potentially present within the system 100 at other points in time).

A given one of the first user 106, second user 108, and the third user 110 is associated with one or more electronic devices. For the sake of simplicity, only a single instance thereof, a user-wireless-device 120 (associated with the first user 106) is depicted. The implementation of the user-wireless-device 120 is not particularly limited, but as an example, the user-wireless-device 120 may be implemented as a personal computer (laptops, netbooks, etc.) or a wireless electronic device (a cell phone, a smartphone, a tablet and the like).

The general implementation of the user-wireless-device 120 is known in the art and, as such, will not be described here at much length. Suffice it to say that the user-wireless-device 120 comprises a user input interface (such as a keyboard, a mouse, a touch pad, a touch screen and the like) for receiving user inputs; a user output interface (such as a screen, a touch screen, a printer and the like) for providing visual or audible outputs to the user; a network communication interface (such as a modem, a network card and the like) for two-way communication over a communication network 118; and a processor coupled to the user input interface, the user output interface and the network communication interface, the processor being configured to execute various routines, including those described herein below.

The user-wireless-device 120 further comprises one or more sensors for sensing one or more sensed conditions. The one or more sensors can include but are not limited to:
a camera
a microphone
an accelerometer
a gravity sensor
a linear acceleration sensor
a gyroscope
a magnetometer
a proximity sensor
an ambient light sensor
a barometer
a thermometer
an air humidity sensor
a pedometer
a fingerprint reader
a harmful radiation sensor
a GPS module
a Bluetooth™ module
a WiFi™ module
a wireless network receivers capable of measuring signal strength
an NFC module The above-mentioned communication network 118 can be implemented as the Internet. In other embodiments of the present technology, the communication network 118 can be implemented differently, such as any wide-area communication network, local-area communication network, a private communication network and the like.

A respective electronic device of each the first user 106, second user 108, and the third user 11 (and their respective electronic device(s) 120) is configured to record readings of at least one sensor. For the sake of simplicity, it shall be assumed that each user-wireless-device 120 records a respective reading of two sensors. It should be, however, understood that in other embodiments other number of readings from other number of sensors can be used. It should also be noted that one user-wireless-device 120 associated with the first user 106 can transmit a different number of readings from a different number of sensors that for example another user-wireless-device 120 associated with, let's say, the third user 110.

The system 100 further comprises a networked server 130. The networked server 130 can be implemented as a conventional computer server. In an example of an embodiment of the present technology, the networked server 130 can be implemented as a Dell™ PowerEdge™ Server running the Microsoft™ Windows Server™ operating system. Needless to say, the networked server 130 can be implemented in any other suitable hardware and/or software and/or firmware or a combination thereof. In the depicted non-limiting embodiment of present technology, the networked server 130 is a single server. In alternative non-limiting embodiments of the present technology, the functionality of the networked server 130 may be distributed and may be implemented via multiple servers.

The implementation of the networked server 130 is well known. However, briefly speaking, the networked server 130 comprises a communication interface (not depicted) structured and configured to communicate with various entities (such as the user-wireless-device 120, for example and other devices potentially coupled to the communication network 118) via the communication network 118. The networked server 130 further comprises at least one computer processor (not depicted) operationally connected with the communication interface and structured and configured to execute various processes to be described herein.

As depicted in FIG. 1, the user-wireless-device 120 associated with the first user 106 transmits, towards the networked server 130, a first data packet 140, the first data packet 140 containing a first sensed parameter of a first sensor and a second sensed parameter of a second sensor, the first sensed parameter and the second sensed parameter being captured by the user-wireless-device 120 during temporal-association of the first user 106 with the first physical entity 112.

The user-wireless-device 120 associated with the second user 108 transmits, towards the networked server 130, a second data packet 142, the second data packet 142 containing a first sensed parameter of a first sensor and a second sensed parameter of a second sensor, the first sensed parameter and the second sensed parameter being captured by the user-wireless-device 120 during temporal-association of the second user 108 with the second physical entity 114.

The user-wireless-device 120 associated with the third user 110 transmits, towards the networked server 130, a third data packet 146, the third data packet 146 containing a first sensed parameter of a first sensor and a second sensed parameter of a second sensor, the first sensed parameter and the second sensed parameter being captured by the user-wireless-device 120 during temporal-association of the third user 110 with the third physical entity 116.

To that end, the networked server 130 receives a set of sensed parameters 148. It is noted that the set of sensed parameters 148 can be received from a subset of users associated with the particular physical location for a pre-defined period of time (i.e. during the temporal-association of the subset of users with the particular physical location). Alternatively, the set of sensed parameters 148 can be received from a subset of users associated with the particular physical location for a larger pre-defined period of time (i.e. during the temporal-association of the subset of users with the particular physical location over multiple periods of time). Additionally, the set of sensed parameters 148 can be received from a larger set of users, with the larger set of users having subsets of users associated with a particular physical location for a pre-defined period of time (i.e. during the temporal-association of the subset of users with the particular physical location). Finally, the set of sensed parameters 148 can be received from a larger set of users, with the larger set of users having subsets of users associated with different physical locations for different periods of time.

It is also noted that the actual receiving of the set of sensed parameters 148 can be executed after the temporal-associated of the associated user-wireless-devices 120 ceased to exist. Furthermore, the set of sensed parameters 148 can be received by the networked server 130 in either a "pull" (i.e. the networked server 130 soliciting transmission of the set of sensed parameters 148), "push" (i.e. the plurality of user-wireless-devices 120 transmitting the set of sensed parameters 148) or a combined push-pull manner In accordance with a specific non-limiting embodiment of the present technology, the networked server 130 comprises a preprocessing module 132, a processing module 134, and a post-processing module 136. Each one of the preprocessing module 132, the processing module 134, and the post-processing module 136 can be implemented in software, hardware executing software, firmware or combination thereof.

Each one of the preprocessing module 132, the processing module 134, and the post-processing module 136 can store or have access to computer executable instructions, which computer executable instructions are configured to trigger the respective one of the preprocessing module 132, the processing module 134, and the post-processing module 136 to execute routines described below.

The networked server 130 has access to (or otherwise comprises) a user profile repository 138. The user profile repository 138 contains user profile information associated with the plurality of users 102. The user profile information can include an indication of one or more online interactions with a given one of the plurality of users 102 with various networked resources (such as those, for example, accessible via the communication network 118. As an example, the one or more online interactions can include a search history associated with the search engine searches executed by the given one of the plurality of users 102. As another example, the one or more online interactions can include a browsing history associated with networked resources visited by the given one of the plurality of users 102. As yet another example, the one or more online interactions can include an action history (such as orders, downloads, streaming content, etc) associated with networked resources executed by the given one of the plurality of users 102.

In some embodiments, user profiles stored in the user profile repository 138 may contain user profiles in a form of records of user-history associated with respective users (such as the plurality of users 102). For example, a web-browsing history of a user may be represented as a catalog of uniform resource identifiers (URIs) of various network resources having been visited by the user, each URI perhaps being accompanied by a timestamp indicative of a date and time that the network resource was visited and/or a dwell time indicative of the amount of time the user presumably spent viewing the network resource. A geographical history of a user, on the other hand, may be represented by a series of geographical coordinates associated with the user, such as position data collected by the user's smartphone or "check-ins" reported by the user to one or more online services, such as social networking services. A search history of a user can be presented as a list of search queries submitted to the search engine over a period of time. In some embodiments, each search query from the list may be supplemented with a timestamp denoting the time when the query was submitted to the search engine and/or and an indication of geographical location from where the search query was submitted. Other types of user events may be contained in the user-history records such as but not limited to user-related actions in social networks, history of clicked advertisements and so forth.

As the user events of different types are conventionally represented using different information formats, they can be challenging to compare and analyze. Furthermore, the sheer number of records in user-history can render analysis of the user events inefficient if not impossible. As such, in some embodiments of the present technology, the user profiles are organized as user history records. The user-history records can be processed (by the networked server 130 or by the user profile repository 138) to process them into a condensed user-profile vectors reflecting user interests, socio-demographic characteristics of a user such as sex, age, income level etc. and other characteristics of the user. Various techniques may be used by the to derive a given-user user profile vector 206 from user-history, such as machine learning algorithms, Naïve Bayes classifiers and so forth. One or more user profile vectors may be obtained from user history using an approach described in the patent application bearing a publication number WO2016038471 A1 by Krasnikov, which is herein incorporated by reference in its entirety in all those jurisdictions where such incorporation by reference is allowed.

The Preprocessing Module 132

Figure 2:
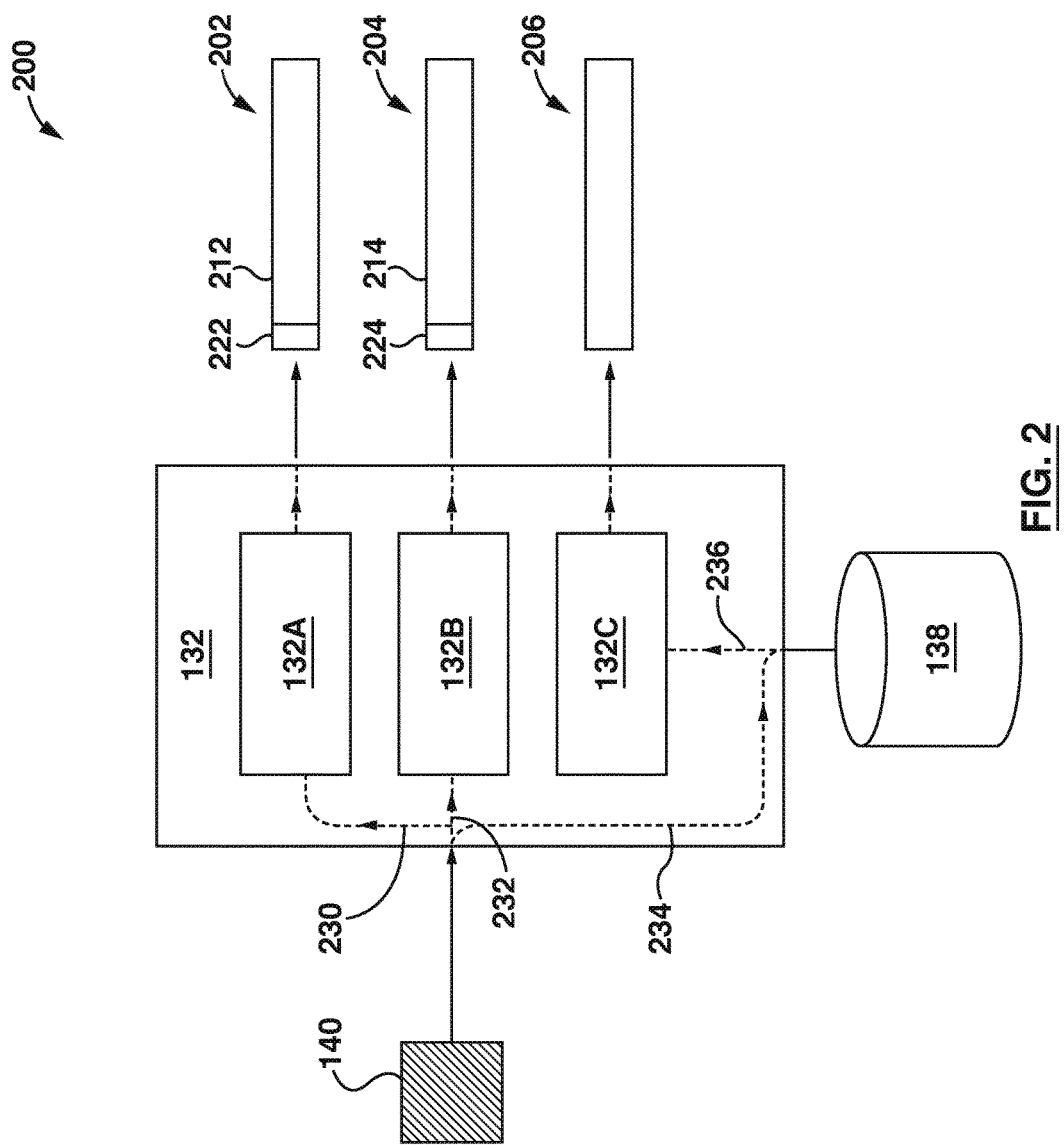
FIG. 2 depicts a schematic representation of a processing of a first data packet by a preprocessing module of the system of FIG. 1 in order to generate a pool of vectors.

Reference will now be made to FIG. 2, which depicts a schematic representation of a processing of the first data packet 140 by the preprocessing module 132 to generate a pool of vectors.

For example, the preprocessing module 132 may be configured to generate the pool of vectors including: a given-user first parameter vector 202, a given-user second parameter vector 204 and a given-user user profile vector 206 based on information received via the first data packet 140.

Additionally, the preprocessing module 132 may generate a respective given-user first parameter vector 202, a respective given-user second parameter vector 204 and a given-user user profile vector 206 for each of the plurality of user-wireless-device 120 respectively associated to a given user within the first plurality of users 102. In other embodiments, the preprocessing module 132 may generate a respective given-user first parameter vector 202, a respective given-user second parameter vector 204 and a given-user user profile vector 206 for at least a portion of user-wireless-devices 120 respectively associated with a given user within the first plurality of users 102.

Assuming that the at least the portion of user-wireless-devices 120 respectively associated to a given user of the first plurality of users 102 comprises the user-wireless-device 120 associated with the first user 106, a second user-wireless-device (not depicted) associated with a different first user (not depicted and being in the first plurality of users 102) within the first plurality of users 102 and a third user-wireless-device (not depicted) associated with a another first user (not depicted and being in the first plurality of users 102).

As a result, the preprocessing module 132 may receive the first data packet 140 associated with the user-wireless-device 120. The preprocessing module 132 may be configured to receive a second data packet (not depicted) associated with the second user-wireless-device. The preprocessing module 132 may be configured to receive a third data packet (not depicted) associated with the third user-wireless-device.

The preprocessing module 132 may process the information in the first data packet 140 in order to generate the given-user first parameter vector 202, the given-user second parameter vector 204 and the given-user user profile vector 206.

Figure 3:
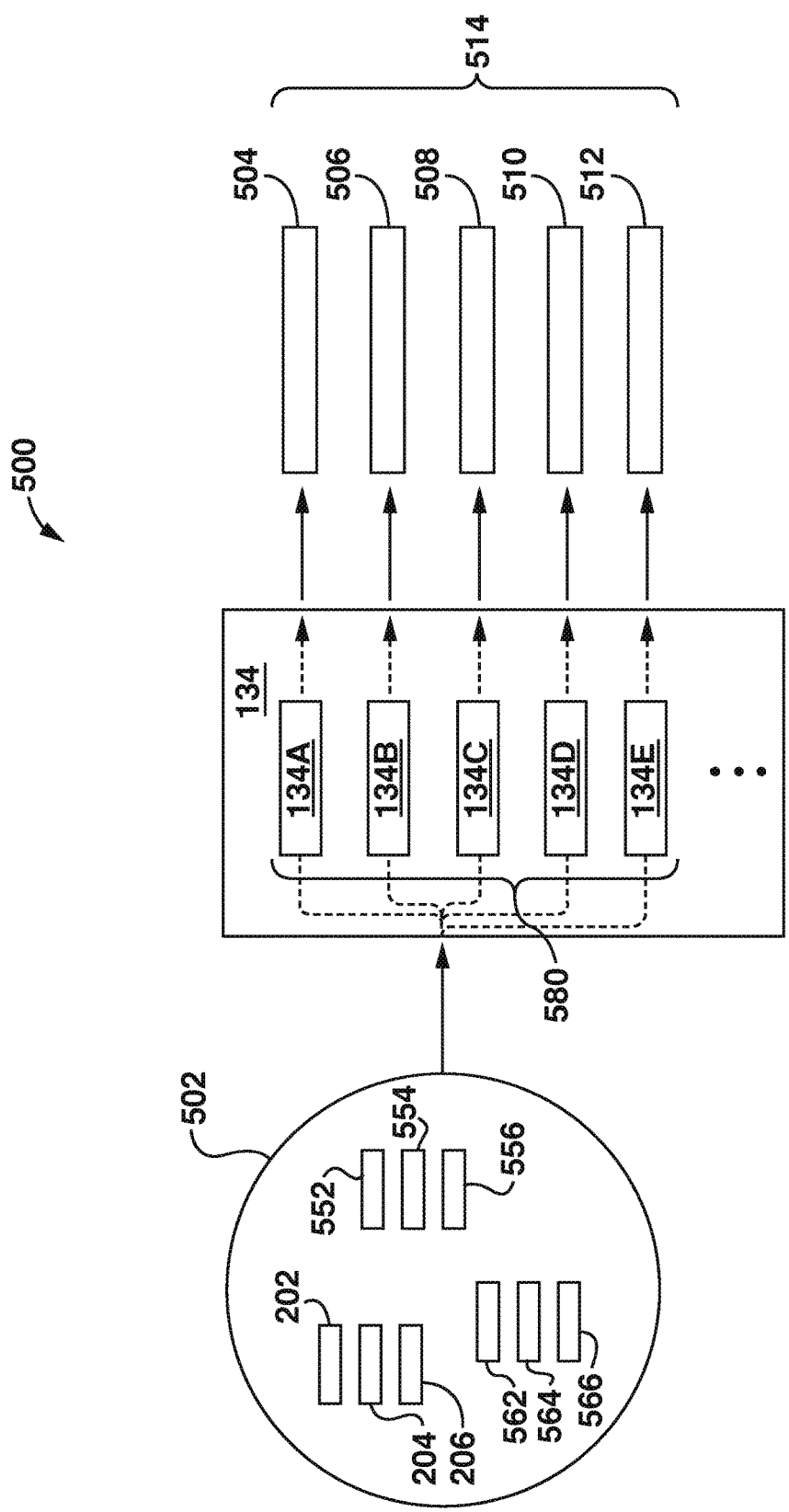
FIG. 3 depicts a schematic representation of a processing of the pool of vectors, which is generated by the preprocessing module depicted in FIG. 2, to generate a plurality of pool-data vectors.

In another embodiment and with a brief reference to FIG. 3, the preprocessing module 132 may process the information in the second data packet, similarly to how the preprocessing module processed the first data packet 140, in order to generate a second given-user first parameter vector 552, a second given-user second parameter vector 554 and a second given-user user profile vector 556. The preprocessing module 132 may be configured to process the information in the third data packet, similarly to how the preprocessing module processed the first data packet 140, in order to generate a third given-user first parameter vector 562, a third given-user second parameter vector 564 and a third given-user user profile vector 566.

Generally speaking, the preprocessing module 132 may be configured to aggregate all given-user first parameter vectors, all given-user second parameter vectors and all given-user user profile vector associated with a common physical entity into a common pool of vectors.

Therefore, in some embodiments, the preprocessing module 132 may be configured to generate the pool of vectors 502 associated with the first physical entity 112. The pool of vectors 502 may comprise the given-user first parameter vector 202, the given-user second parameter vector 204 and the given-user user profile vector 206, the second given-user first parameter vector 552, the second given-user second parameter vector 554, the second given-user user profile vector 556, the third given-user first parameter vector 562, the third given-user second parameter vector 564 and the third given-user user profile vector 566.

Operation of the preprocessing module 132 in accordance with a specific non-limiting embodiment of the present technology will now be explained in greater detail.

It should be recalled that the sensed parameters 148 of multiple sensors of the plurality of user-wireless-devices 120 are received by the networked server 130. The sensed parameters 148 are then processed by the preprocessing module 132 of the networked server 130. In accordance with some embodiments of the present technology, the preprocessing module 132 comprises a $1^{st}$ preprocessing submodule 132A, a $2^{nd}$ preprocessing submodule 132B, and a user profile preprocessing submodule 132C.

Each individual preprocessing submodule in the preprocessing module 132, such as the $1^{st}$ preprocessing submodule 132A and the $2^{nd}$ preprocessing submodule 132B, receives the sensed parameters 148 of its associated type and is configured to execute the processing thereof in order to generate output vectors. Each sensed parameter output vector is subsequently transmitted to the processing module 134.

In some embodiments of the present technology, each of the $1^{st}$ preprocessing submodule 132A and the $2^{nd}$ preprocessing submodule 132B (as well as other preprocessing submodules potentially present within the preprocessing module 132) is configured to process its unique type of sensed parameters 148 and/or configured to apply its unique processing algorithm.

The user-wireless-device 120 associated with the first user 106 may be configured to generate the first data packet 140 depicted in FIG. 2. For example, the first data packet 140 may be received by the preprocessing module 132 of the networked server 130 via the communication network 118 from the user-wireless-device 120 associated with the first user 106 located in the proximity to the first physical entity 112. The first data packet 140 may comprise the first sensed parameter of the first sensor of the user-wireless-device 120 and the second sensed parameter of the second sensor of the user-wireless-device 120.

For the description to be presented below, the first sensed parameters received by the $1^{st}$ preprocessing submodule 132A may be representative of sound data. The $1^{st}$ preprocessing submodule 132A may extract the first sensed parameter from the first data packet 140 and retrieve it via a first data path 230. For example, the $1^{st}$ preprocessing submodule 132A may be configured to receive and process sounds obtained by microphones of a given user-wireless-device 120. The $1^{st}$ preprocessing submodule 132A may apply known sound processing techniques as well as speech recognition techniques in order to generate at least one output vector for the first sensed parameter, such as a given-user first parameter vector 202. Other output vectors (not depicted) from the $1^{st}$ preprocessing submodule 132A may be associated with, for example, music, speech, volume, frequencies of the sound data received from any one of the plurality of user-wireless-devices 120 potentially present in the system 100.

For example, one of the other output vectors outputted from the $1^{st}$ preprocessing submodule 132A may comprise information about a particular music record having been recognized based on the sound data. To that end, the $1^{st}$ preprocessing submodule 132A may apply a second algorithm in order to match the sound data with known music records from a music records database (not depicted) and to retrieve the metadata associated with the particular music record such as, for example, artist, title, genre, album etc. In other embodiments, responsive to the outcome of the classification indicating that the sound data contains music, the $1^{st}$ preprocessing submodule 132A may generate the one of the other output vectors outputted therefrom comprising classification information regarding the music record genre via a machine learning algorithm specifically trained for this purpose.

In some non-limiting embodiments, in case that the outcome of the classification of the sound data indicates that the sound data contains speech, the $1^{st}$ preprocessing submodule 132A may subsequently apply a speech recognition algorithm to the sound data in order to derive words and phrases in natural language.

In some non-limiting embodiments of the present technology, the $1^{st}$ preprocessing submodule 132A may be additionally configured to determine physical characteristics of the sound data such as volume, frequency, etc.

In some non-limiting embodiments of the present technology, the outputs of one or more algorithms employed in the $1^{st}$ preprocessing submodule 132A may be used to generate a first output vector (such as the given-user first parameter vector 202), i.e. a string of numbers or an alphanumeric sequence of a predefined length. Hashing functions, machine learning algorithms and other vectorization techniques may be used to generate a first output vector (such as the given-user first parameter vector 202).

In some non-limiting embodiments of the present technology, one of the measured parameters received by the $2^{nd}$ preprocessing submodule 132B (for example via a second data path 232) may be image data and the $2^{nd}$ preprocessing submodule 132B may be configured to receive and preprocess images obtained by cameras of the plurality of user-wireless-devices 120 potentially present in the system 100. The $2^{nd}$ preprocessing submodule 132B may apply known image processing techniques such as, for example, image recognition techniques in order to generate one or more feature vectors for each input image data.

For example, the $2^{nd}$ preprocessing submodule 132B is configured to extract image characteristics from the image data such as: (i) presence of a human, (ii) presence of a building, (iii) presence of sky, (iv) presence of a road, (v) presence of urban areas, (vi) probability of a face being depicted in a given digital image, etc.

Additionally, or alternatively, the $2^{nd}$ preprocessing submodule 132B may be configured to extract the target image characteristics associated with visual properties of digital images such as: (i) brightness, (ii) texture, (iii) contrast, (iv) depth, (v) color parameters of the image data.

Additionally or alternatively, the 2nd preprocessing submodule 132B may be configured to extract the target image characteristics associated with physical or positional properties of digital images such as: (i) transparency, (ii) temperature derived from recorded wavelengths within the given digital image, (iii) size of an object within the image, (iv) relative size of the object to a size of another object within the given digital image, (v) position of the object, (vi) relative position of the object to a position of the another object within the image data.

In some non-limiting embodiments of the present technology, the outputs of one or more algorithms employed in the $2^{nd}$ preprocessing submodule 132B may be used to generate a $2^{nd}$ output vector (such as a given-user second parameter vector 204), i.e. a string of numbers or an alphanumeric sequence of a predefined length. Hashing functions, machine learning algorithms and other vectorization techniques may be used to generate the $2^{nd}$ output vector (such as the given-user second parameter vector 204).

It should be note that examples with sound-type sensed parameter and image-type sensed parameter described herein are not intended to limit the scope of the present technology. Other types of parameters obtained from the aforementioned sensors and modules of electronic devices may be input into respective preprocessing submodules associated with respective parameter type. Hashing, n-gram encoding, machine learning algorithms and other techniques may be used to preprocess sensed parameters received by each preprocessing submodule in order to generate respective output vectors.

Referring again to FIG. 2, the first data packet 140 may further contain a user identifier (not depicted) associated with the first user 106. The user identifier is sent to the user profile repository 138 along a third data path 234. The user profile repository 138 retrieves a user profile matching the user identifier and transmits it into the user profile preprocessing submodule 132C along a data path 236.

The user profile preprocessing submodule 132C can process user profiles (or user profile vectors) receives from the user profile repository 138. In those embodiments, where the user profile repository 138 stores user profiles as user profile vectors (and hence, no additional preprocessing is required), user profile preprocessing submodule 132C may be omitted and the given-user user profile vector 206 may be directly retrieved from user profile repository 138.

Preprocessing module 132 may be further configured to analyze output vectors of its submodules and/or their respective input sensed parameters in order to find correlations between the output vectors and identify patterns therebetween. For this purpose the preprocessing module 132 may employ one or more machine learning algorithms known in the art.

For example, the preprocessing module 132 may analyze the outputs of a submodule associated with atmospheric pressure sensor parameters and a submodule associated with pedometer (that counts each step a person takes by detecting the motion of the person's hands or hips) parameters. The preprocessing module 132 may detect that the information encoded in the combination of the pressure vector and pedometer vector indicates that a user went to the upper floor in the building using the stairs. The preprocessing module 132 may incorporate information about this identified event and other identified events if any into a supplementary vector (not depicted) and send it to the processing module along with other vectors produced by preprocessing submodules such as vectors 202 and 204, as part of the pool of vectors) in the example depicted on FIG. 2 to the processing module 134.

The Processing Nodule 134

The preprocessing module 132 may be configured to transmit the pool of vectors to the processing module 134 for further processing thereof. A schematic representation 500 of the processing of the pool of vectors 502 is depicted in FIG. 3. In some embodiments, the processing module 134 may implement at least two analysis models. In other embodiments, the processing module 134 may implement a plurality of analysis models 580. The plurality of analysis models 580 may comprise a first analysis model 134A, a second analysis model 134B, a third analysis model 134C, a fourth analysis model 134D and a fifth analysis model 134E.

Generally speaking, a given analysis model may be configured to generate a given pooled-data vector based on the pool of vectors 502. A given pool-data vector is indicative of at least some semantic intelligence extracted from the pool of vectors 502 by the given analysis model.

The semantic intelligence may be representative of at least one of data patterns, hidden relations in the data, information identifying classes or any other information that characterizes a logic in the data that is comprised in the pool of vectors 502 and where the given analysis model has been configured to characterise that logic. In other embodiments of the present technology, the semantic intelligence may be representative of various associations between given-user first parameter vectors, given-user second parameter vectors and given-user user profile vectors.

In some cases, the given analysis model is a statistical analysis model which may employ at least one of histograms, averages, percentiles, etc. In other cases, the given analysis model is a probabilistic analysis model such as a Bayesian model, maximum a posteriori (MAP) model, maximum likelihood (ML) model, hidden Markov model, etc. The given analysis model may also be based on at least one of heuristics, clusterisation algorithms. The given analysis model may be a recurrent neural network such as a long short-term memory neural network. The given analysis model may be a latent dirichlet allocation (LDA) model. However, it should be noted that the given analysis model may be any other machine learning algorithm for generating the given pool-data vector based on the pool of vectors 502.

The processing module 134 may be configured to receive the pool of vectors 502. Additionally, the processing module 134 may be configured to input the pool of vectors 502 into each analysis model within the plurality of analysis models 580. More specifically, the pool of vectors 502 (that is based on the given-user first parameter vector 202, the given-user second parameter vector 204 and the given-user user profile vector 206, the second given-user first parameter vector 552, the second given-user second parameter vector 554, the second given-user user profile vector 556, the third given-user first parameter vector 562, the third given-user second parameter vector 564 and the third given-user user profile vector 566) may be inputted into each one of the first analysis model 134A, the second analysis model 134B, the third analysis model 134C, the fourth analysis model 134D and the fifth analysis model 134E.

Each one of the plurality of analysis models 580 may be configured to output a respective pool-data vector. In other words, the first analysis model 134A may output a first pool-data vector 504, the second analysis model 134B may output a second pool-data vector 506, the third analysis model 134C may output a third pool-data vector 508, the fourth analysis model 134D may output a fourth pool-data vector 510 and the fifth analysis model 134E may output a fifth pool-data vector 512. As a result, the plurality of analysis models 580 may be configured to analyse the pool of vectors 502 for generating a plurality of pool-data vectors 514.

As previously mentioned, each pool-data vector of the plurality of pool-data vectors 514 is indicative of at least some semantic intelligence extracted from the pool of vectors 502 via a respective analysis model. Therefore, a respective pool-data vector of the plurality of pool-data vectors 514 is indicative of respective semantic intelligence that is extracted via a respective analysis model that is configured to extract that respective semantic intelligence. In other words, each analysis model may be configured to characterize a unique type of logic and, therefore, extract a unique type of semantic intelligence from the pool of vectors 502. This means that each pool-data vector of the plurality of pool-data vectors 514 is indicative of a respective unique type of semantic intelligence extracted via a respective analysis model.

Responsive to generating the plurality of pool-data vectors 514, the processing module 134 may be configured to generate an entity-vector (not depicted) using at least some of the plurality of pool-data vectors 514. In order to generate the entity-vector, the processing module 134 may be configured to execute at least some of: (i) dimensions clustering techniques, (ii) dimensionality reduction techniques, (iii) aggregation methods, (iv) concatenation methods and (v) other methods for agglomerating data from multiple vectors. The processing module 134 may be configured to generate the entity-vector which is representative of a collective semantic intelligence about the first physical entity 112.

It is contemplated that a given entity-vector is indicative of a plurality of unique types of semantic intelligence. Indeed, since the given entity-vector is generated based on at least some of the plurality of pool-data vectors 514, the given entity-vector may be indicative of a plurality of unique types of semantic intelligence associated with the at least some of the plurality of pool-data vectors 514. As an example, if the at least some of the plurality of pool-data vectors 514, based on which the given entity-vector is generated, comprise 5 distinct pool-data vectors (which are generated via 5 distinct analysis models), the given entity-vector may be indicative of 5 distinct types of semantic intelligence respectively associated with each of the 5 distinct pool-data vectors and with each of the 5 distinct analysis models.

Additionally, the given entity-vector may also be indicative of correlations between data of the at least some of the plurality of pool-data vectors 514 based on which the given entity-vector is generated. For example, the given entity-vector may be indicative not only of information having distinct types of semantic intelligence, but also of at least one of data patterns, hidden relations or any other information that characterizes a logic between the information having these distinct types of semantic intelligence.

Naturally, the processing module 134 can repeat process for other geographical locations and/or the same geographical location but for a different period of time. As a result of this iterative entity-vector generation, the processing module 135 can generate a "virtual map" of a physical world split into specific geographical locations/specific physical entities. The virtual map is made of the entity-vectors associated with the various specific geographical locations/specific physical entities. The entity-vectors can be updated, over time, as will be described for example below.

The Post-Processing Module 136

In some embodiments of the present technology, the post-processing module 136 is configured to receive the generated entity-vector associated with the at least one geographical location generated by the processing module 134.

In some embodiments of the present technology, the post-processing module 136 receives a plurality of so-generated entity-vectors generated by the processing module 134. Within these embodiments of the present technology, the post-processing module 136 can generate a vector trend model based on the plurality of generated entity-vectors associated with the same geographical location, but associated with different periods of time for example. Alternatively, the post-processing module 136 can generate a vector trend model based on the plurality of generated entity-vectors associated with different geographical locations, associated with either the same or different periods of time for example.

The post-processing module 136 can use the vector trend models for various analyzing and prediction routines. For example, the vector trend model can be used by the post-processing module 136 to predict a new entity-vector associated with at least one geographical location associated with a future period of time. Alternatively, the post-processing module 136 can use the vector trend model to determine a shift in pattern for a new entity-vector associated with at least one geographical location associated with a period of time that occurs in the future. For example, if an entity-vector predicted by the vector trend model and an actual entity-vector generated by the processing module 134 for a given future period of time is different, the post-processing module 136 can determine that there is a shift in the trend of the user behaviour around the given geographical location. Analyzing of such trends shifts can allow detecting changes in the given geographical location (for example, a road closure, opening or closure of certain POIs, etc.).

In some embodiments of the present technology, the post-processing module 136 uses the so-generated entity-vectors as an input into an auxiliary machine learning algorithm (not depicted) to train auxiliary machine learning algorithm to predict a particular parameter. It is noted that the generation of the plurality of entity-vectors is done without the knowledge of the particular parameter. In other words, the entity-vector can be said to be "universal"—i.e.

it can be used for a plethora of predictions (i.e. multiple machine learning algorithms, etc.) without a priori knowing the particular parameter that the prediction will be outputting.

In some embodiments, universality of a given entity-vector may be attributed to the fact that the given entity-vector can be indicative of information having distinct types of semantic intelligence and information regarding correlations between the information having these distinct types of semantic intelligence. Indeed, entity-vectors that are indicative of information having a large variety of types of semantic intelligence are representative of a large variety of parameters and, therefore, is more likely to be representative of the particular parameter without a priori knowing this particular parameter. Additionally, since the given entity-vector can also be indicative of information regarding correlations between the information having distinct types of semantic intelligence, this information regarding correlation may be representative of additional parameters that are a priori unknown.

As previously mentioned, the universality of each entity-vector allows the plurality of entity-vectors to be used for a plethora of predictions. At least some implementations where the plurality of entity-vectors are used by auxiliary MLAs will now be described. However, it should be understood that other implementations to the at least some implementations described herein below may be contemplated without departing from the scope of the present technology.

In some embodiments, the plurality of entity-vectors may be used for classifying a given POI based on user interests, tasks and/or activities that were conducted at the given POI. The interest, task and/or activity may be determined based on user specific data and sensor data such as movement patterns, level of noise, heart-rate and more.

In one embodiment, POIs may be classified based on user comfort and/or user safety when users are in proximity to these POIs.

For example, let it be assumed that a given entity-vector associated with a first POI at a first moment in time is indicative of the fact that a large number of users are travelling in proximity of the first POI at the first moment in time at a relatively low speed (slow walking) for users. The post-processing module 136 may compare this given entity-feature vector associated with the first POI at the first moment in time to an entity-vector predicted by the vector trend model for the first POI for the first moment in time.

The post-processing module 136 may be configured to compare this predicted entity-vector with the given entity-vector and, as a result, may determine whether the given entity-vector is substantially different from the predicted entity-vector. In one example, the post-processing module 136 may compute a vectorial distance between the predicted entity-vector and the given entity-vector and compare the vectorial distance to a predetermined threshold having been determined by the operator of the post-processing module 136. If the vectorial distance is superior to the predetermined threshold, the post-processing module 136 may determine that this predicted entity-vector is substantially different from the given entity-vector. The computation of the vectorial distance is not particularly limiting and may be any of a plurality of known vectorial distances such as, for example, a Euclidean distance.

If the predicted entity-vector is substantially different from the given entity-vector, the post-processing module 136 may be configured to determine that an anomaly occurred in proximity to the first POI at the first moment in time. In other words, since the given entity-vector is representative of a "current state" of the first POI at the first moment in time and since the predicted entity-vector is representative of a "predicted state" of the first POI at the first moment in time, the post-processing module 136 may determine that the current state is substantially different from the predicted state of the first POI at the first moment in time and, therefore, may thereby determine that the anomaly occurred in proximity to the first POI at the first moment in time.

As such, the post-processing module 136 may be configured to trigger an itinerary recommendation service, for example, executed by the server 130, to recommend itineraries that avoid the first POI at the first moment in time. Such triggers may be useful since the anomaly may suggest that, for example, some area in proximity to the first POI is under construction at the first moment in time and that the large number of users are travelling in proximity to the first POI at the relatively low speed due to user congestion which renders travelling or commuting uncomfortable. Therefore, sending a comfort-based trigger to the itinerary recommendation service may allow some users of the itinerary recommendation service to avoid uncomfortable areas.

In another example, let it be assumed that a given entity-vector associated with a second POI at a second moment in time is representative of the fact that (i) users are travelling in proximity of the second POI at the second moment in time at relatively high speeds (running) for users, (ii) these users have elevated heart-rates and (iii) high levels of noises associated with human screaming are recorded. The post-processing module 136 may compare this given entity-feature vector associated with the second POI at the second moment in time to an entity-vector predicted by the vector trend model for the second POI for the second moment in time. If this predicted entity-vector is substantially different from the given entity-vector, the post-processing module 136 may be configured to determine that an anomaly occurred in proximity to the second POI at the second moment in time.

It should be noted that the determination of whether the predicted entity-vector for the second POI at the second moment in time is substantially different from the given entity-vector for the second POI at the second moment in time may be executed similarly to how the port-processing module 136 is configured to determine whether the given entity-vector for the first POI at the first moment in time is substantially different from the predicted entity-vector for the first POI at the first moment in time.

As such, the post-processing module 136 may be configured to trigger the itinerary recommendation service, for example, executed by the server 130, to recommend itineraries that avoid the second POI at the second moment in time. Such triggers may be useful since the anomaly may suggest that, for example, a dangerous or life-threatening event, such as a shooting or an explosion, is occurring in proximity to the second POI at the second moment in time. The anomaly may be suggestive of the dangerous or the life-threatening event because (i) the users are travelling in proximity to the second POI at relatively high speeds since they may be running away from danger, (ii) their heart-rates are elevated and (ii) the high levels of noises associated with human screaming may be indicative of the users being scared by some type of danger. Therefore, sending a safety-based trigger to the itinerary recommendation service may allow some users of the itinerary recommendation service to avoid unsafe areas at given moments in time.

In another embodiment, the plurality of entity-vectors may be used for classifying POIs based on similarity of entity-vectors. For example, the post-processing module 136 may be configured to determine the vectorial distances between entity-vectors associated with different POIs. If the post-processing module 136 determines that the vectorial distances between the entity-vectors associated with a first POI and the entity-vectors associated with a second POI are below a predetermined threshold, the post-processing module 136 may be configured to group the first and the second POI into a given similarity cluster. POIs within a given similarity cluster may share similar characteristics such as having a same entity-type, a similar user-traffic associated therewith, similar user behaviours associated with users that are in proximity to these POIs, and the like.

As such, the post-processing module 136 may predict information about a given POI within a given similarity cluster based on information about another given POI within that similarity cluster. For example, the server 130 may be configured to generate a vector trend model for the first POI within the given similarity cluster. As a result, instead of generating another vector trend model for the second POI within that given similarity cluster and, therefore, consuming computational resources of the server 130, the post-processing module 136 may be configured to estimate the vector trend model for the second POI based on the vector trend model of the first POI since the first and the second POIs are within the same similarity cluster. In other words, the post-processing module 136 may determine that a shift in pattern in entity-vectors associated with the first POI is an acceptable estimation of the shift in pattern in entity-vectors associated with the second POI, without the need to expressly determining the shift in patter in entity-vectors associated with the second POI.

For example, this may indicate that a predicted future user behaviour associated with the first POI is an acceptable estimation of future user behavior associated with the second POI as long as the first and the second POI are within the same similarity cluster.

In yet another embodiment, server 130 may be configured to group POIs based on their geo-graphical proximity to one another. For example, the server 230 may group POIs into a given geo-graphical cluster if these POIs are located within a geo-graphical area defined by a predetermined radius. The predetermined radius may be determined by the operator of the post-processing module 136. It is contemplated that entity-vectors associated with at least one POI within a given geo-graphical cluster may be influenced by entity-vectors associated with other POIs within the given geo-graphical cluster. In other words, it is contemplated that user activity, behaviour and/or interactions near the at least one POI may be influenced by user activity, behaviour and/or interactions near the other POIs within the given geo-graphical cluster due to their geo-graphical proximity to one another.

In some embodiments of the present technology, the server 130 may be configured to train a given untrained auxiliary MLA to determine interdependence of entity-vectors associated with POIs that are within a same geo-graphical cluster. For example, during a first training iteration of the given untrained auxiliary MLA, the server 130 may input entity-vectors associated with different POIs within the respective geo-graphical cluster as well as respective geo-coordinates of each POI into the given untrained auxiliary MLA. As a result, the given untrained auxiliary MLA can, in a sense, learn hidden relationships or influence of entity-vectors of different POIs within the given geo-graphical cluster on each other. It is contemplated that the untrained auxiliary MLA may be trained via an unsurprised machine learning method. Subsequent training iterations of the untrained auxiliary MLA may be performed similarly to how the first training iterations is performed, but with distinct geo-graphical clusters.

In some embodiments of the present technology, the given trained auxiliary MLA may be configured to predict the influence of a given POI on other POIs that are in close proximity thereto (e.g., within the predetermined radius for a given geo-graphical cluster). In other words, the given trained auxiliary MLA may be configured to determine the influence of entity-vectors of a given POI on entity-vectors of other POIs that are in close proximity thereto. In some embodiments of the present technology, the given trained auxiliary MLA may allow estimating urbanistic influence of new structures or locations on its surroundings.

For example, let it be assumed that a new POI is planned to be constructed at a provided specific geo-graphical location and is associated with an entity-type such as a movie theater. As previously mentioned, the post-processing module 136 may predict information about the new POI based on information about other POIs that are associated with the movie theater entity-type in a given similarity cluster that groups similar POIs to the new POI. In other words, the post-processing module 136 may determine predicted entity-vectors associated with the new POI based on the entity-vectors associated with the other POIs that are within the similarity cluster which groups the movie theater entity-type POIs.

As such, based on the predicted entity-vectors for the new POI, which are determined based on entity-vectors of other POIs in the similarity cluster that groups the movie theater entity-type POIs, the trained auxiliary MLA may be configured to predict the influence of the new POI on POIs that are in close proximity to the provided specific geo-graphical location where the new POI is planned to be constructed. In other words, the trained auxiliary MLA may be configured to determine POI-influenced entity-vectors for POIs that are in close proximity to the provided specific geo-graphical location based on the predicted entity-vectors of the new POI. These POI-influenced entity-vectors for POIs that are in close proximity to the provided specific geo-graphical location may be indicative of predicted user activity, behaviour and/or interactions near the POIs that are in close proximity to the provided specific geo-graphical location as if the new POI was constructed at the provided specific geo-graphical location.

This may be useful for selecting an optimal geo-graphical location for constructing the new POI since the predicted user activity, behaviour and/or interactions near the POIs that are in close proximity to a given geo-graphical location are indicative of whether the construction of the new POI at the given geo-graphical location will have a positive or negative effect on the user activity, behaviour and/or interactions near the POIs that are in close proximity to the given geo-graphical location.

It should be noted that some physical entities may be generated through generation of regions on an electronic map. In some embodiments, each region may be considered as a separate physical entity. For example, the electronic map may be divided into equal regions of a pre-defined size through applying a square grid onto the electronic map.

In other embodiments, regions of different size and shape may be generated. For example, areas with higher user population density or higher concentration of known POIs may be split into physical entities by applying a grid with comparatively smaller cells. On the other hand, rural or uninhabited areas or those with low concentration of POI's may be split into larger regions by applying a grid with comparatively larger cells.

It is contemplated that a given grid applied onto the electronic map may be in more than two dimensions such as, for example, three dimensions, four dimensions and the like and will depend on inter alia different implementations of the given grid. For example, time may be used for generating an additional dimension of the grid.

In some embodiments, an object layer may be used for mapping entity-vectors of respective physical entities onto the grid. Generally speaking, the object layer may be a separate layer from the grid. The object layer may comprise information about various objects of the physical world. This object layer may be overlaid over the grid and the information about various objects of the object layer may be mapped onto the grid. It is contemplated that the objects may be extracted from the object layer as separate physical entities and respective entity-vectors may be associated with these objects in the object layer. Thus, by mapping the objects onto the grid, the respective entity-vectors associated with the respective physical entities can also be mapped onto the grid.

It is contemplated that some physical entities and their respective entity-vectors may be aggregated based on various levels of scale of the grid. For example, at a first level of scale of the grid, the entity-vectors of two physical entities may be mapped onto respective cells of the grid. These respective cells of the grid at the first level of scale may be adjacent or in such a close proximity to each other that these respective cells correspond to a common cell of the grid at a second level of scale. As such, the respective entity-vectors of the two physical entities may be aggregated into a compressed entity-vector and may be associated with an aggregated physical entity. Thus, the compressed entity vector of the aggregated physical entity, which is representative of the two physical entities on the grid at the first level of scale, may be mapped onto the common cell of the grid at the second level of scale.

For explanation purposes only, let it be assumed that, at the first level of scale of the grid, the two physical entities are a lake and a soccer field and that their respective entity-vectors are mapped onto respective cells of the grid that are in a closed proximity to each other. In this case, the two physical entities may be aggregated into an aggregated physical entity such as a park, which is representative of the lake and the soccer field. Also, the respective entity-vectors associated with the lake and the soccer field may be aggregated into a given compressed entity-vector that will be associated with the aggregated physical entity which is the park. As such, at the second level of scale of the grid, instead of mapping the respective entity-vectors associated with the two physical entities (the lake and the soccer field), the compressed entity-vector being representative of at least some information of the respective entity-vectors associated with the two physical entities (the lake and the soccer field) may be mapped in association with the aggregated physical entity (the park) onto the common cell of the grid.

It is also contemplated that entity-vectors of at least some physical entities may be mapped onto entity-specific grids. For example, dynamic physical entities, such as buses, ships, trains and the like, may move or change position on the electronic map. As such, instead of mapping the entity-vectors of dynamic physical entities onto the grid used to map entity-vectors of static physical entities, such as buildings, parks and the like, the entity-vectors of dynamic physical entities may be mapped onto their respective entity-specific grids.

A given entity-specific grid may be generated based on a large amalgamation of information gathered from user devices that moved in accordance with the respective dynamic physical entity. The so-generated entity-specific grid for the respective dynamic physical entity may then be applied, additionally to the grid used to map entity-vectors of static physical entities, onto the electronic map. As such, the entity-vector of the respective dynamic physical entity may be mapped onto the given entity-specific grid, instead of being mapped onto the grid used to map entity-vectors of static physical entities.

Therefore, in some embodiments of the present technology, a plurality of grids may be applied to the electronic map and may be at least partially overlaid by one another. As such, the entity-vectors of at least some physical entities may be mapped onto one of the plurality of grids and the entity-vectors of at least some other physical entities may be mapped onto other ones of the plurality of grids.

It is contemplated that each given entity-vector has a predetermined dimensionality and that at least some dimensions of a given entity-vector may not be associated with a respective alpha-numerical value but instead, may be associated with various data sets having different data structures. For example, a given dimension of a given entity-vector may be associated with a data set structured as a table or according to a dictionary format. Additionally, a given data set associated with a given dimension of the entity-vector may be indicative of pre-processed information. Pre-processing information and storing it as the given data set in a given dimension of the entity-vector may allow for a more effective updating, aggregation or use thereof.

Figure 4:
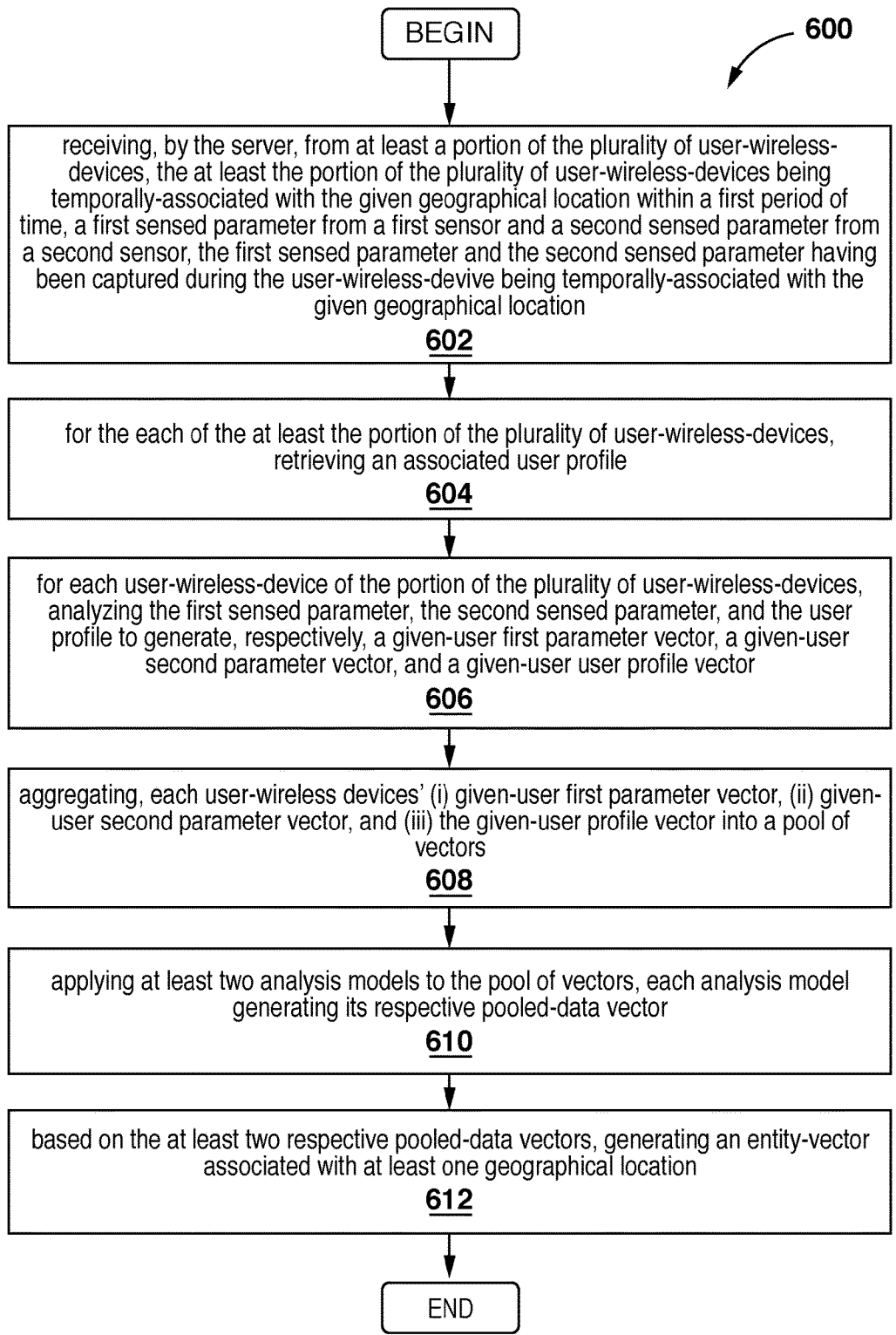
FIG. 4 depicts a block diagram of a method, the method being implemented in accordance with other non-limiting embodiments of the present technology, the method executable within the system of FIG. 1.

Given the architecture described above, it is possible to execute a method of generating an entity-vector. With reference to FIG. 4, there is depicted a block diagram of a method 600, the method 600 being implemented in accordance with non-limiting embodiments of the present technology. In some embodiments, the method 600 can be executed by the networked server 130.

The method 600 is described in relation to a given geographical location for a given period of time (and, as will be discussed herein below, can be repeated for multiple geographical locations and/or multiple periods of time).

Step 602—receiving, by the server, from at least a portion of the plurality of user-wireless-devices, the at least the portion of the plurality of user-wireless-devices being temporally-associated with the given geographical location within a first period of time, a first sensed parameter from a first sensor and a second sensed parameter from a second sensor, the first sensed parameter and the second sensed parameter having been captured during the user-wireless-device being temporally-associated with the given geographical location The method begins at step 602, where the networked server 130 receives, from at least a portion of the plurality of user-wireless-devices, the at least the portion of the plurality of user-wireless-devices being temporally-associated with the given geographical location within a first period of time, a first sensed parameter from a first sensor and a second sensed parameter from a second sensor, the first sensed parameter and the second sensed parameter having been captured during the user-wireless-device being temporally-associated with the given geographical location.

Step 604—for the each of the at least the portion of the plurality of user-wireless-devices, retrieving an associated user profile At step 604, the networked server 130, for the each of the at least the portion of the plurality of user-wireless-devices, retrieves an associated user profile.

Step 606—for each user-wireless-device of the portion of the plurality of user-wireless-devices, analyzing the first sensed parameter, the second sensed parameter, and the user profile to generate, respectively, a given-user first parameter vector, a given-user second parameter vector, and a given-user user profile vector At step 606, the networked server 130, for each user-wireless-device of the portion of the plurality of user-wireless-devices, analyzes the first sensed parameter, the second sensed parameter, and the user profile to generate, respectively, a given-user first parameter vector, a given-user second parameter vector, and a given-user user profile vector.

Step 608—aggregating, each user-wireless devices' (i) given-user first parameter vector, (ii) given-user second parameter vector, and (iii) the given-user user profile vector into a pool of vectors At step 608, the networked server 130 aggregates, each user-wireless devices' (i) given-user first parameter vector, (ii) given-user second parameter vector, and (iii) the given-user user profile vector into a pool of vectors.

Step 610—applying at least two analysis models to the pool of vectors, each analysis model generating its respective pooled-data vector At step 610, the networked server 130 applies at least two analysis models to the pool of vectors, each analysis model generating its respective pooled-data vector.

Step 612—based on the at least two respective pooled-data vectors, generating an entity-vector associated with the at least one geographical location At step 612. The networked server 130, based on the at least two respective pooled-data vectors, generates an entity-vector associated with the at least one geographical location.

In some embodiments of the method 600, at least a portion of the method 600 is executed by a neural network. The neural network is long short-term memory (LSTM) based neural network. It should be understood, however, that other types of recursive or other neural networks can be used. It should be further understood that other types of machine learning algorithms can be used for implementing other parts of the method 600.

The method 600 then terminates.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method executable at a server,
the server being a part of a system,
the system including a plurality of user-wireless-devices accessible by the server via a communication network;
each of the plurality of user-wireless-devices including at least two sensors, each of the at least two sensors outputting a respective sensed parameter;
the server hosting a repository of user profiles;
the method comprising:
for a given geographical location:
receiving, by the server, from at least a portion of the plurality of user-wireless-devices, the at least the portion of the plurality of user-wireless-devices being temporally-associated with the given geographical location within a first period of time, a first sensed parameter from a first sensor and a second sensed parameter from a second sensor, the first sensed parameter and the second sensed parameter having been captured during the user-wireless-device being temporally-associated with the given geographical location;
for the each of the at least the portion of the plurality of user-wireless-devices, retrieving an associated user profile;
for each user-wireless-device of the portion of the plurality of user-wireless-devices, analyzing the first sensed parameter, the second sensed parameter, and the user profile to generate, respectively, a given-user first parameter vector, a given-user second parameter vector, and a given-user user profile vector;
aggregating, each user-wireless devices' (i) given-user first parameter vector, (ii) given-user second parameter vector, and (iii) the given-user user profile vector into a pool of vectors;
applying at least two analysis models to the pool of vectors, each analysis model generating its respective pooled-data vector;
based on the at least two respective pooled-data vectors, generating an entity-vector associated with the at least one geographical location.

2. The method of claim 1, wherein the analyzing the first sensed parameter, the second sensed parameter, and the user profile vector comprises:
applying a first algorithm to the first sensed parameter;
applying a second algorithm to the second sensed parameter;
applying a third algorithm to the user profile;
the first algorithm, the second algorithm, and the third algorithm having been pre-selected of a respective data type of the first sensed parameter, the second sensed parameter, and the user profile.

3. The method of claim 1, wherein at least a portion of the method is executed by a neural network.

4. The method of claim 3, wherein the neural network is long short-term memory (LSTM) based neural network.

5. The method of claim 1, wherein the given geographical location is a first geographical location and wherein the method further comprises:
for a second geographical location repeating the steps of:
receiving, retrieving, analyzing, aggregating, applying, and generating the entity-vector.

6. The method of claim 1, wherein the method further comprises: for the given geographical location associated with at least one physical entity:
receiving, by the server, from at least the portion of the plurality of user-wireless-devices, the at least the portion of the plurality of user-wireless-devices being temporally-associated with the given geographical location within a second period of time, a third sensed parameter from the first sensor and a fourth sensed parameter from the second sensor, the third sensed parameter and the fourth sensed parameter having been captured during the user-wireless-device being temporally-associated with the given geographical location during the second period of time;
for each user-wireless-device of the portion of the plurality of user-wireless-devices, analyzing the third sensed parameter and the fourth sensed parameter to generate, respectively, a given-user third parameter vector and a given-user fourth parameter vector;

aggregating, each user-wireless devices' (i) given-user third parameter vector, (ii) given-user fourth parameter vector, and (iii) the given-user user profile vector into a second pool of vectors;

applying at least two analysis models to the second pool of vectors, each analysis model generating its respective second pooled-data vector;

based on the at least two respective second pooled-data vectors, generating a second entity-vector associated with the at least one geographical location for the second period of time.

7. The method of claim 6, wherein the second entity-vector is different from the entity vector.

8. The method of claim 7, further comprising generating a vector trend model based on the entity vector and the second entity-vector.

9. The method of claim 8, wherein the vector trend model allows predicting a third entity-vector associated with the at least one geographical location associated with a third period of time.

10. The method of claim 8, wherein the vector trend model allows determining a shift in pattern for a third entity-vector associated with the at least one geographical location associated with a third period of time.

11. The method of claim 5, the method further comprises using the entity vector and the second entity vector as an input into an auxiliary machine learning algorithm to train auxiliary machine learning algorithm to predict a particular parameter.

12. The method of claim 11, wherein the generation of the entity vector and the second entity vector is done without the knowledge of the particular parameter.

13. The method of claim 2, wherein at least some of the first algorithm, the second algorithm, and the third algorithm are different.

14. The method of claim 6, further comprising analyzing the second entity-vector and the entity vector to determine a static vector portion and a dynamic vector portion.

15. The method of claim 1, wherein applying at least two analysis models to the pool of vectors comprises applying at least two different analysis models, each analysis model applying its own algorithm to output its respective pooled-data vector.

16. The method of claim 15, wherein at least one of the at least two analysis models comprises a probabilistic analysis model.

17. The method of claim 15, wherein at least one of the at least two analysis models comprises at least one of heuristics and a clusterization algorithm.

18. The method of claim 15, wherein at least one of the at least two analysis models comprises a recurrent neural network.

19. The method of claim 15, wherein at least one of the at least two analysis models comprises a latent dirichlet allocation (LDA) model.

* * * * *